Figure 1:
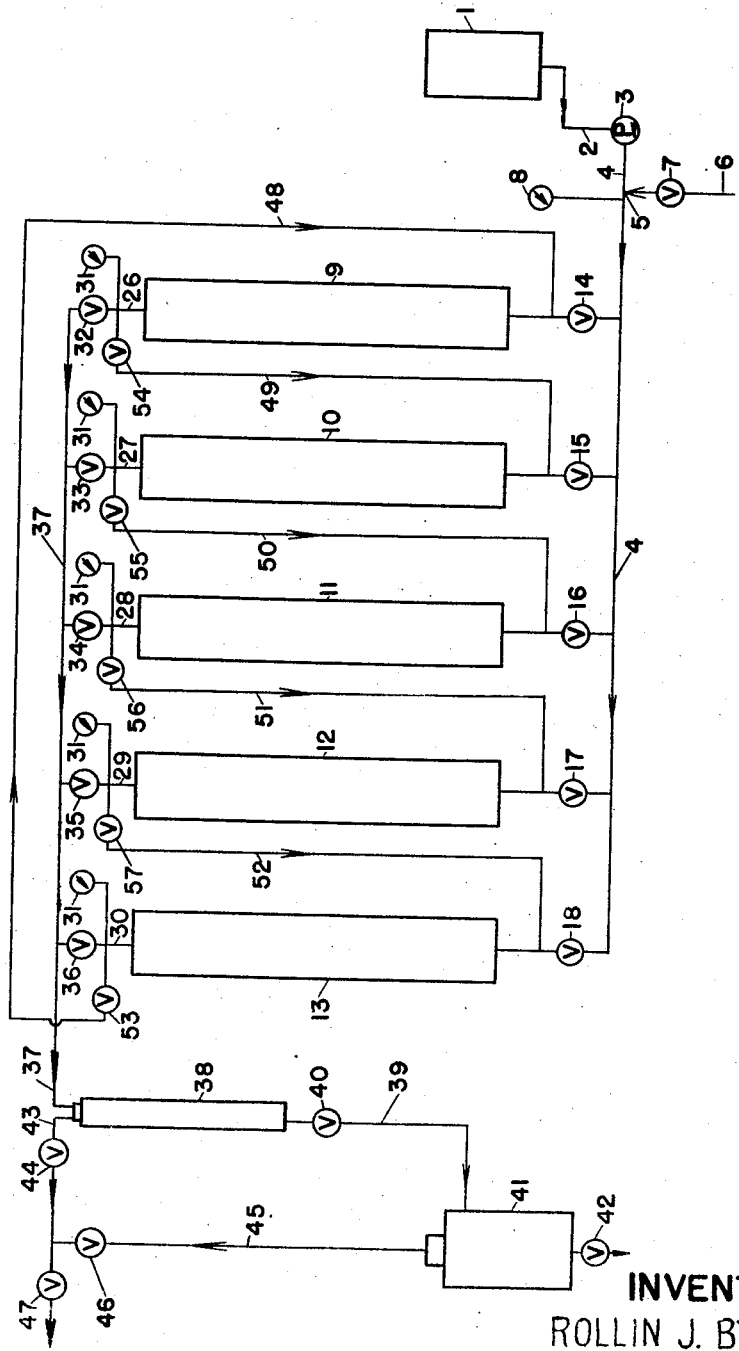

Oct. 3, 1939.    R. J. BYRKIT, JR    2,174,651
HYDROGENATION PROCESS
Filed May 17, 1937    3 Sheets-Sheet 1

INVENTOR
ROLLIN J. BYRKIT, JR.
BY Edward B Beale
ATTORNEY

Oct. 3, 1939.  R. J. BYRKIT, JR  2,174,651
HYDROGENATION PROCESS
Filed May 17, 1937  3 Sheets-Sheet 3

INVENTOR
ROLLIN J. BYRKIT, JR.
BY *Edward B. Beal*
ATTORNEY

Patented Oct. 3, 1939

2,174,651

UNITED STATES PATENT OFFICE 2,174,651

HYDROGENATION PROCESS

Rollin J. Byrkit, Jr., Marshallton, Del., assignor to Hercules Powder Company, Wilmington, Del., a corporation of Delaware Application May 17, 1937, Serial No. 143,193

REISSUED
MAY 14 1940

15 Claims. (Cl. 260—100)

This invention relates to a process and apparatus for the continuous hydrogenation of unsaturated organic compounds and more particularly to a process and apparatus for the continuous hydrogenation of rosins and other compounds which are difficult to hydrogenate.

Heretofore the hydrogenation of rosin has not been successfully accomplished from a practical standpoint, although the desirability of hydrogenated rosin has long been known, as shown by United States Patent 1,249,050 to Ellis and United States Patent 1,167,264, to Brooks. This has been due to the great difficulties involved and to limitations imposed by the development of the art of hydrogenation.

The hydrogenation of rosin in a batch or noncontinuous process has been suggested heretofore, but has not met with commercial success. In such a process the rosin is placed in a closed vessel, as, for example, an autoclave, together with the catalyst in the form of a finely divided powder and hydrogen admitted under pressure. The conditions of temperature and hydrogen pressure are adjusted to meet the requirements of the hydrogenation process, and after a lapse of sufficient time the hydrogenation is more or less complete.

From the commercial or economic standpoint, and even from a technical standpoint, such non-continuous hydrogenation procedure is subject to many disadvantages, certain of which are due to the non-continuous nature of the process and others of which are due to the type of catalyst necessarily employed. Still other disadvantages are due to the characteristics of rosin, such as its physical state and active acidity. Among these disadvantages of processes for the hydrogenation of rosin heretofore practiced the following may be specifically considered.

At the conclusion of a batch hydrogenation it is necessary to filter or otherwise separate the hydrogenated rosin from the catalyst employed. This is a difficult filtration and must be accomplished in a heated filter press and the presscake removed hot. This requires the maintenance of suitable equipment and represents an expensive and time-consuming operation. Where the catalyst used is in powder form, as is invariably the case, it can be separated from the viscous molten rosin only with very great difficulty.

The catalyst is in service for only a portion of the time required for a complete cycle of operations, since during the charging of the hydrogenation vessel, filtration and recovery of the filtered catalyst, the catalyst performs no useful function. In fact, the catalyst is often harmed by the exposure and necessary handling.

Because of this necessary handling and exposure the useful life of the hydrogenation catalyst is greatly shortened and its activity declines more rapidly than would be the case if it were subjected only to the use incident to hydrogenation. The diminution in activity of the catalyst is, in fact, due largely to the discontinuity of the hydrogenation and the active acid nature of the rosin. Furthermore, when the useful life of the catalyst is at an end it must be discarded, since the requisite reworking necessary to fit it for further use constitutes a greater expense than the procurement of new catalysts.

When a hydrogenation catalyst is used in a non-continuous hydrogenation process it is found that, unless it be a noble metal catalyst, the hydrogenated rosin produced is contaminated to an appreciable extent by the catalyst, and so far hydrogenation with noble metal catalysts has been used only as an instrument of laboratory technique due to its high cost. This contamination occurs each time the catalyst is used in the process with a corresponding loss of catalyst. Accordingly the hydrogenated rosin produced is contaminated in this manner, and the catalyst lost.

Because of the difficulties occasioned by the separation of catalyst from the hydrogenated rosin it is practically essential to maintain the ratio of catalyst to the rosin to be hydrogenated as low as possible. However, it is known that the rate of hydrogenation is usually in this type of hydrogenation proportional to the amount of catalyst present. Accordingly, maintaining a low catalyst ratio, while economically and practically necessary in non-continuous procedure, is extremely disadvantageous.

It is impossible to maintain the activity of the hydrogenation catalyst in non-continuous hydrogenation processes at a uniform level, although it is extremely desirable that this should be done. The only manner in which the catalyst activity may be maintained at an aproximately uniform level in non-continuous processes is by the addition of small increments of fresh catalyst. It is apparent that this practice is limited by the total amount of catalyst which can be filtered and handled in the process.

The successful commercial hydrogenation of rosin involves the handling of large volumes of material. Since such hydrogenation requires the use of high hydrogenation pressures, the size of the autoclaves required for commercial operation is so massive as to be entirely impractical, due principally to their great cost.

These are a few of the disadvantages of the batch or non-continuous method of hydrogenating rosin. These are real difficulties which have, so far, effectively prevented the practical hydrogenation of rosin in spite of the desire for hydrogenated rosin in many commercial uses. Although continuous hydrogenation in the liquid phase has heretofore been carried out, the application has been limited to compounds which readily combine with hydrogen, and do not have a markedly unfavorable action upon the catalyst or where very high temperatures are used in connection with rugged, but relatively inactive, catalysts as in hydrogenation of petroleum. Such procedure has not been successful when applied to rosin. This is due in part to the extreme difficulty of hydrogenating the second double bond in the hydrocarbon nucleus of rosin acid which makes the hydrogenation of rosin and compounds containing a rosin acid nucleus to highly saturated materials extremely difficult, and in part to the very marked action of rosin and other chemically active compounds containing a rosin acid nucleus upon the types of catalysts heretofore used in continuous liquid phase hydrogenation.

It is the object of this invention to avoid these difficulties and to provide an efficient and economical process adapted for commercial operation by which unsaturated organic compounds, normally difficult to hydrogenate, may be continuously hydrogenated to a relatively high and uniform degree of saturation. It is a further object of this invention to provide an apparatus in which this method may be conveniently and efficiently carried out.

In accordance with the process of this invention, an unsaturated organic compound or other organic compound capable of hydrogenation in the liquid state is passed continuously through a plurality of reaction vessels or reactors packed with a stationary hydrogenation catalyst such as, for example, pellets of an activated nickle-aluminum alloy catalyst, in each of which the unsaturated compound is contacted with hydrogen at suitable pressure and temperature. In carrying out this process I pass the unsaturated compound through the plurality of reactors at a rate which may be varied directly with the activity of the catalyst until the activity of the catalyst becomes so low that the rate of flow is too slow to be practical, and then replace the spent catalyst in the first reactor with fresh catalyst and rearrange the order of the reactors so that this first reactor becomes the last or final reactor and the reactor which was second now becomes the first. The process is then continued until the rate again becomes slow and again the catalyst in the reactor which is now first (orignally second) is replaced, the reactor placed at the end of the process, and the second-reactor (originally third) made the first. This is then repeated periodically as long as the process is continued, and after each recharging the rate of flow may be stepped up to approximately its original value.

In this way, I obtain a cyclic process in which the untreated compound is first hydrogenated in the presence of the least active catalyst and then successively treated in the presence of lots of catalysts of greater and greater activity. Furthermore, I obtain a process in which any catalyst poisons which may be, and frequently are, present in the material being hydrogenated are trapped by the catalyst which is most nearly spent and, hence, least valuable.

Thus, I obtain a maximum efficiency of hydrogenation for the amount of catalyst used and produce uniformly hydrogenated products over long periods of time.

The hydrogen may, if desired, be admixed with the material being hydrogenated as it enters the first reactor and flow concurrently with the material through the entire series of reactors. This is the most convenient method of operation and I prefer to use it. Alternately, the hydrogen may be introduced into each of the reactors separately and flow either concurrently or counter-currently to the direction of flow of the material being hydrogenated. Again the hydrogen may be introduced into the final reactor and flow counter-currently throughout the series of reactors.

The process in accordance with this invention is suitable for the hydrogenation of an unsaturated organic material which is a liquid at the temperatures and pressures required for hydrogenation, or which may be put into solution in a suitable solvent, and is particularly adapted for the hydrogenation of a rosin such as, for example, wood rosin, American gum rosin, French gum rosin, etc., and for the hydrogenation of compounds which contain the hydrocarbon nucleus of a rosin acid, such as, for example, esters of a rosin acid with a monohydric or polyhydric alcohol, as, methyl abietate, ethyl abietate, glycerol abietate, etc., the alcohols produced by the reduction of the carboxyl group of a rosin acid, as, abietyl alcohol, pimaryl alcohol, etc., the esters of these alcohols, etc., unsaturated organic compounds which contain the hydrocarbon nucleus of a rosin acid will for convenience be termed rosinyl compounds.

The choice of catalyst to be used in the continuous hydrogenation of the organic compound will be determined chiefly by the difficulty involved in its hydrogenation, possible chemical action upon catalysts available, and nature of the end product or products desired. For example, in the continuous hydrogenation of rosin and other abietyl compounds in accordance with this invention, the catalyst may be produced by alloying together nickel and aluminum, comminuting the resultant alloy into particles or fragments of the desired side and then treating the alloy with hydrogen or with an alkaline solution, such as sodium carbonate or sodium hydroxide solution to activate the surface of the alloy. The production of this catalyst is described more fully in United States Letters Patent No. 1,628,190, dated May 10, 1927, and 1,915,473, dated June 27, 1933, issued to Murray Raney.

In forming the nickel-aluminum alloy from which the catalyst is made it is often desirable to include in the alloy a relatively small amount of other metal as, for example, copper, zirconium, cerium, cobalt, etc., which acts as a promoter and increases the activity of the resultant catalyst for certain hydrogenations. The activity of the catalyst may also be enhanced by heat-treating the alloy, as by annealing, quenching, etc.

For the hydrogenation of unsaturated organic compounds in accordance with this invention, the nickel-aluminum alloy which may contain other metals as promoters, or which may have been subjected to heat treatment or both, is used in the form of particles or fragments graded to a size which will pass through holes in a perforated plate having a diameter of ½", and be retained on a perforated plate having holes ⅛" in diameter, and preferably of a size that will pass through holes in a perforated plate having a diameter of ¼" and be retained on a perforated plate having holes ³⁄₃₂" in diameter.

The most desirable size of the particles of the alloy is controlled by two opposing sets of factors. High yield of catalyst, low loss in activation and the tendency of the stream of the material being treated to pick up small particles of the alloy, suggest the use of large particles. On the other hand, high efficiency of hydrogenation, both as to degree of saturation and as to rate of production, suggest the use of fine particles. I have found in my process that the range of sizes passed by a plate perforated with ¼" holes, but retained by a plate perforated with ³⁄₃₂" holes gives the maximum efficiency in actual operation.

The catalyst alloy may be obtained in particles or fragments of the desired size by a "shotting" operation from the molten condition, or by casting the alloy in masses of a larger size and then crushing, as, for example, by means of a jaw crusher. After the grading operation, the particles which are too large may be further reduced in size or remelted, and the particles which are too small may be remelted and thus made suitable for further use.

These particles may then be activated by treatment with hydrogen or with an alkali or otherwise as described in the Raney patents and charged into the hydrogenation equipment. Since the catalyst after activation is intensely active and indeed pyrophoric in nature, it must be transferred to the hydrogenation equipment covered with a film of water or other protective coating. Alternatively, the unactivated alloy may be charged into the hydrogenation equipment and be activated therein, as, for example, by treatment with an alkali solution. If an alkali solution is used, the activated catalyst in place in the hydrogenation equipment will be washed free of alkali and other foreign substances with water and then dried by being heated in a current of an inert gas, as, for example, a current of hydrogen, super-heated steam, etc., or by displacement by suitable solvents as alcohol, acetone, etc.

Figure 2:
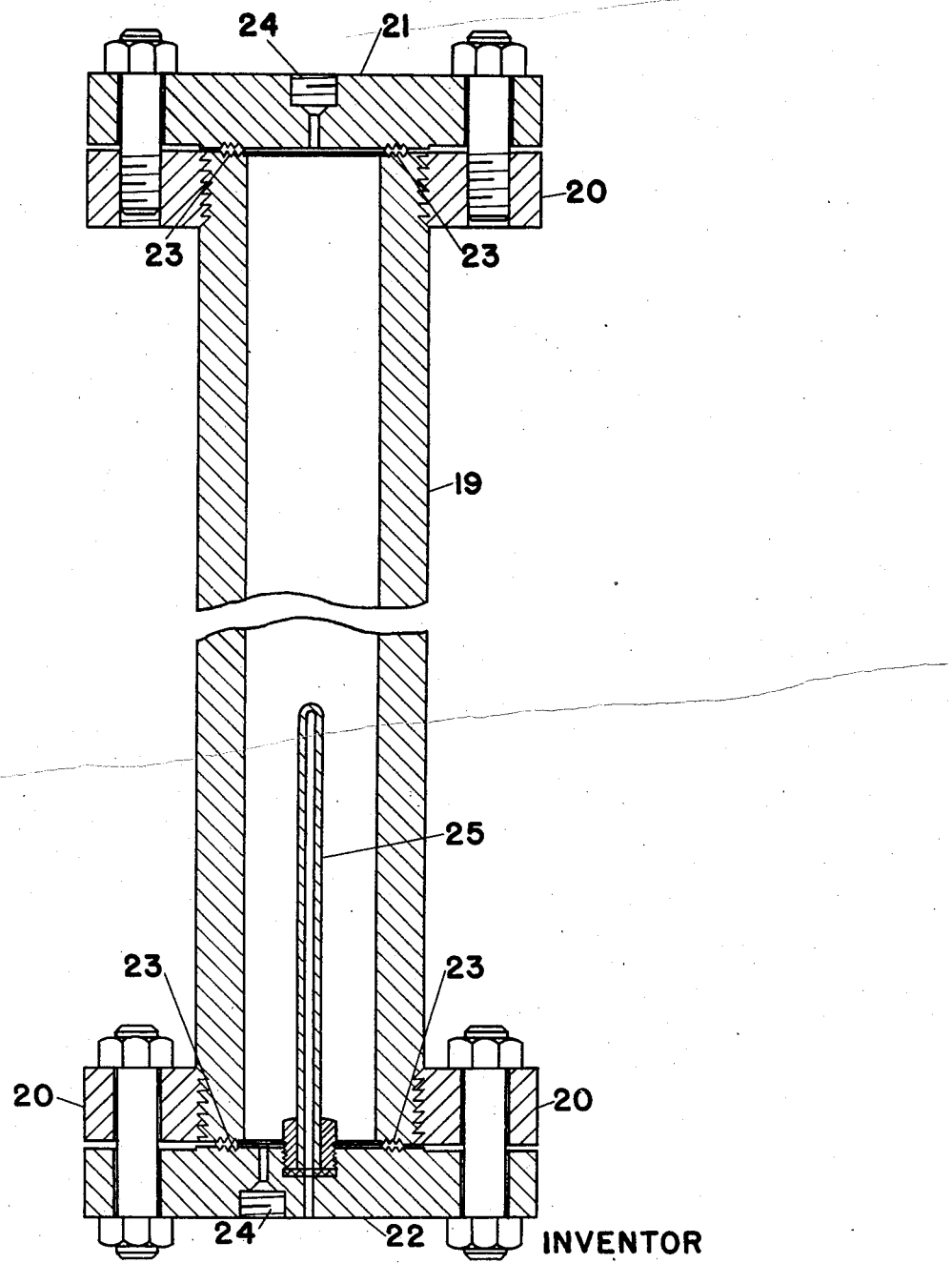
Figure 3:
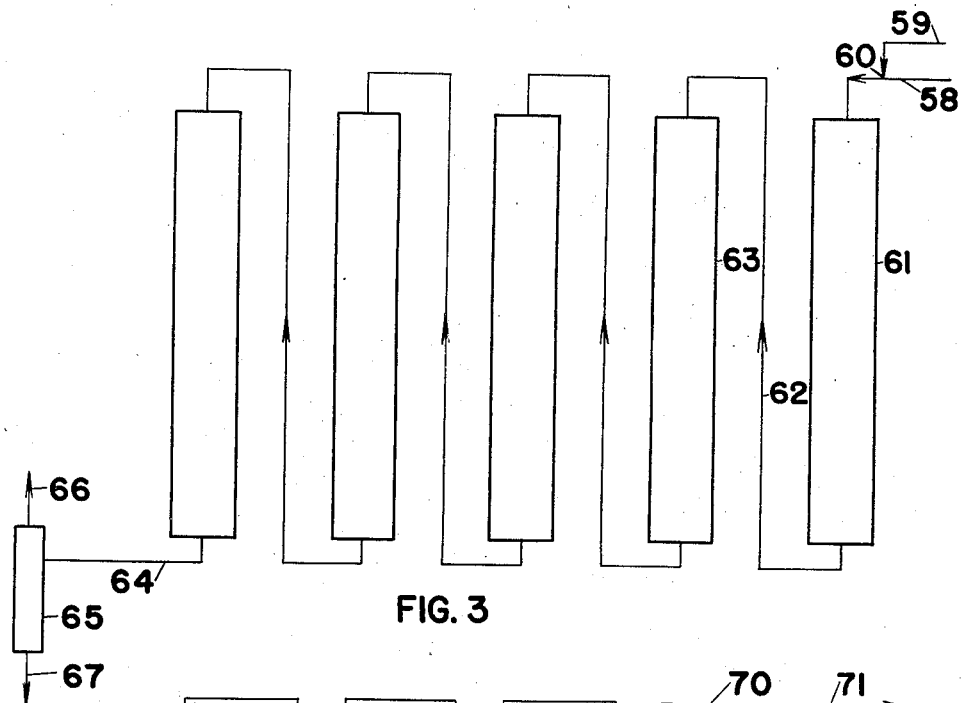
Figure 4:
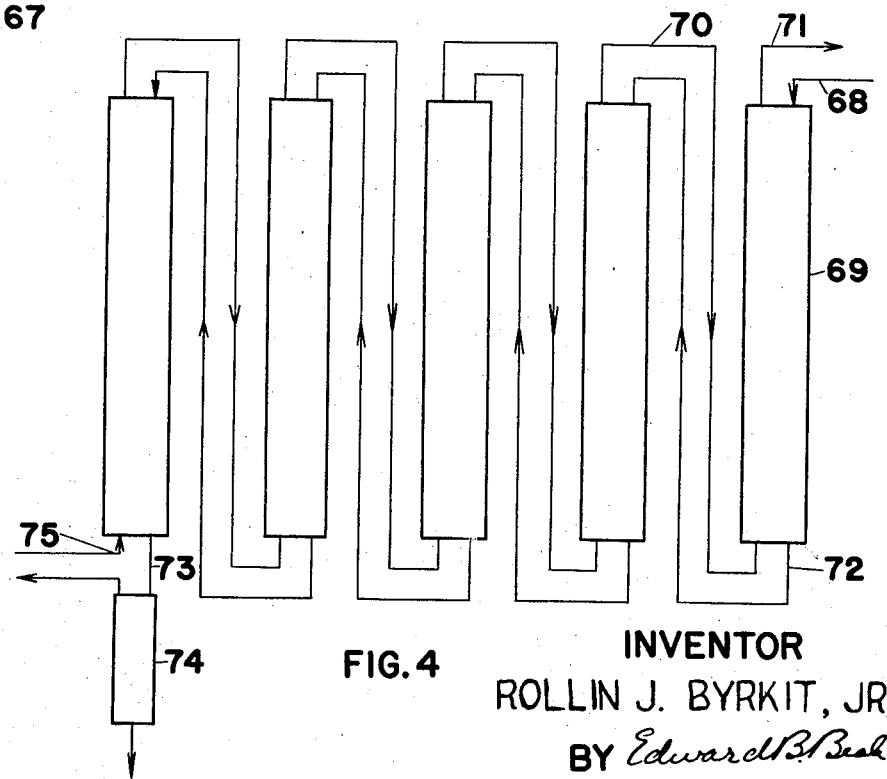

Having now indicated in a general way the nature and purpose of my invention, I will proceed to a more detailed description thereof, by reference to the accompanying drawings, in which:

Figure 1 is a diagrammatic view of the preferred embodiment of the apparatus in accordance with my invention, which I shall term the "concurrent, up-flow apparatus", Figure 2 is a vertical sectional view of one form of a reaction vessel or reactor in which hydrogenation is carried out in my process and which is used in the apparatus shown in Figure 1, Figure 3 is a schematic view of an alternative arrangement of the apparatus in accordance with this invention, which I shall term the "concurrent down-flow apparatus", and Figure 4 is a schematic view of a second alternative arrangement of the apparatus in accordance with this invention, which I shall term the "counter-current down-flow apparatus".

The preferred form of my apparatus, shown diagrammatically in Figure 1, consists of a reservoir 1 for the unsaturated material to be hydrogenated, which when used with an unsaturated material which is solid at room temperature, such as rosin, will be provided with a heating means, for example, an electrical heating coil, to maintain its contents at a suitable elevated temperature. The reservoir 1 is connected by a conduit 2 to a variable-feed pump 3. The pump 3 is connected on the outlet side to a conduit 4, which is capable of withstanding high pressure, and which is in turn joined at 5 by a hydrogen inlet line 6 which is provided with a valve 7. The line 4 is provided with a pressure gauge 8, and is connected with the lower end of each of a plurality of reaction vessels 9, 10, 11, 12 and 13, through the valves 14, 15, 16, 17 and 18.

The reaction vessels or reactors are packed with a stationary hydrogenation catalyst, as for example, particles of nickel-aluminum alloy which have been treated to render them catalytically active as described hereinbefore. The reactor may be of any suitable design, such as, for example, that shown in detail in Figure 2. It may be constructed of any material capable of withstanding an elevated temperature, high pressure, and the corrosive action of the material to be hydrogenated. For the hydrogenation of rosin, I have found an 18–8 chrome-nickel steel to be suitable. The entire reactor may, for example, be constructed of the chrome-nickel steel or it may be constructed of another metal, for example, ordinary steel, and lined with chrome-nickel steel.

The reactor shown in Figure 2 consists of an elongated tube 19 provided at each end with flanges 20, 20 to which are removably attached a top-plate 21 and bottom-plate 22, each of which is provided with a sealing gasket 23, 23 which may, for example, be made of annealed copper or other suitable material. Both the bottom-plate 22 and the top-plate 21 are provided with openings 24, 24 for attaching conduits for the incoming and outgoing material being hydrogenated. The bottom-plate 22 is provided with a well 25 adapted to contain a thermocouple or other temperature measuring device. The reactor will be provided with some means of heating, as, for example, an electrical resistance unit wound around the outside with suitable insulation (not shown).

As shown in Figure 1, the upper end of each of the reactors is connected through the outlet conduits 26, 27, 28, 29 and 30 each of which is provided with a pressure gauge 31 and with the valves 32, 33, 34, 35 and 36, respectively, and connected to the conduit 37 which is in turn connected to a high-pressure type gas-liquid separator 38. The liquid outlet of the separator 38 is connected through a conduit 39, provided with a valve 40, to a low-pressure type gas-liquid separator 41 provided with a liquid outlet 42. The gas outlet of separator 38 is connected to a conduit 43 provided with a pressure reducing valve 44. The gas outlet of separator 41 is connected to a conduit 45, provided with a valve 46 and in turn connected to the conduit 43. The conduit 43 is provided on the outlet side of its junction with conduit 45 with a valve 47 continued to a gas-compressor and storage tanks.

The inlet conduits of each of the reactors 9, 10, 11, 12 and 13, respectively, are connected by conduits 48, 49, 50, 51 and 52, respectively, through the valves 53, 54, 55, 56 and 57, respectively, to the outlet conduits 30, 26, 27, 28 and 29, respectively, of the reactors 13, 9, 10, 11 and 12, respectively.

Each of the reactors is surrounded with an electrical heating coil or otherwise heated, as for example, by steam, either saturated or superheated, hot oil, hot diphenyl, mercury vapor, as may be most suitable to keep it at the desired temperature, as determined by a thermocouple or other suitable temperature measuring device, located in the well 25, as shown in Figure 2.

In starting this apparatus into operation for the hydrogenation of an unsaturated material, such as, for example, rosin, each of the reactors 9, 10, 11, 12 and 13 is charged with a stationary hydrogenation catalyst, such as, for example, activated nickel-aluminum catalyst to fill the reactor to a point near the top, the catalyst being at all times kept out of contact with air by keeping it flooded with an inert volatile liquid, such as, for example, water. After the charging operation the reactors are sealed into place and the inert liquid blown out of the catalyst by a stream of inert gas. When the catalyst is dry, rosin in the molten condition is forced by the pump 3 through the conduit 4 and is joined by a stream of hydrogen at 5. This admixture is then by the proper adjustment of the various valves, passed up through one of the reactors, for example, reactor 9 in which the mixture of rosin and hydrogen flows up through the catalyst and the rosin partially reacted with the hydrogen, after passing through the first reactor, the mixture of hydrogen and partially hydrogenated rosin is passed to the bottom of another reactor.

Thus, from reactor 9, the mixture could be passed through conduit 49 and then up through reactor 10, by closing valve 32 and opening valve 54. The mixture is then passed in turn through each of the reactors in this way and finally flows through conduit 37 to the separator 38 in which the gas phase (hydrogen) is separated from the liquid phase (hydrogenated rosin containing dissolved hydrogen). The hydrogen passes out through conduit 43. The liquid phase passes through conduit 39 to the separator 41, in which the dissolved hydrogen comes out of solution due to the lower pressure and is separated from the hydrogenated rosin. This hydrogen passes out through conduits 45, and 43 in which it is joined by the hydrogen from separator 38, and then passes to a compressor and then tanks, in which it is stored for further use. Alternately, the excess hydrogen may be circulated around the system by means of a suitable pump, rather than expanded, and then recompressed for further use. The hydrogenated rosin passes out through conduit 42 to containers for shipment or storage tanks as may be desired.

The sequence in which the mixture of rosin and hydrogen flows through the reactors will depend upon the positions of various valves in the various conduits. In Table I, I have tabulated the positions of various valves which control the direction of flow necessary to secure the various sequences of reactors which may be followed in the course of a long continued operation.

During the use of any given series of reactors the extent of hydrogenation of the unsaturated material may be maintained at a uniform level by decreasing the rate of flow of the mixture of the unsaturated material and hydrogen through the reactors. When this rate of flow becomes too slow to be economical, or if a higher degree of saturation is desired, the first reactor of the sequence is charged with fresh catalyst and the operation continued using a sequence in which the freshly charged reactor is the final reactor. Thus, referring to Table I, if reactor sequence A was in use and then interrupted, for example, because the rate had become slow, the reactor 9 would be charged with fresh catalyst, and operation resumed using the reactor sequence B. It is not, as will be appreciated, necessary to discontinue operations while one or more reactors is being recharged. It is always possible to operate with any number of reactors, up to the maximum number contained in the installation, without interrupting the cyclic nature of the operation, and, hence, one or more reactors may be cut out of the cycle while the hydrogenation is being continued in the remaining reactors.

The temperature and pressure maintained during hydrogenation, as well as the particular stationary hydrogenation catalyst selected, will depend upon the material being subjected to hydrogenation and the nature of the products desired. For the hydrogenation of compounds which are difficult to hydrogenate it is essential to proceed within rather definite ranges of conditions to obtain a sufficiently high degree of saturation to be of value. Rosin is an example of a compound which is difficult to hydrogenate, while acetone is an example of one which is easily hydrogenated.

Thus, for example, under a given set of conditions, while the first double bond in rosin and other rosinyl compounds can be hydrogenated at temperatures of about 100° C. and hydrogen pressures of about 100 lbs. or less per square inch, satisfactory hydrogenation of the second double bond requires temperatures of the order of 210° C. to 230° C. and hydrogen pressures of 4000 to 5000 lbs. per square inch. Under other conditions, however, as, for example, when dissolved in a solvent, as naphtha, isopropyl ether, etc., temperatures as low as 70° C. and hydrogen pressures as low as 100 lbs. per square inch may be used with satisfactory results.

For the hydrogenation of rosin in the molten condition, I have found that it is desirable to use a temperature within the range of about 125° C. to about 300° C. and a hydrogen pressure in excess of 1000 lbs. per square inch, and preferably a temperature within the range of about 180° C. to 220° C. and a pressure within the range of 2500 to 5000 lbs. per square inch. Pressures in excess of 5000 lbs. per square inch are desirable from the standpoint of the degree of saturation secured, but ordinarily the advan-

*Table I*

| Reactor sequence | Valve number | | | | | | | | | | | | | | |
|---|---|---|---|---|---|---|---|---|---|---|---|---|---|---|---|
| | 14 | 15 | 16 | 17 | 18 | 32 | 33 | 34 | 35 | 36 | 53 | 54 | 55 | 56 | 57 |
| A (9—10—11—12—13) | O | C | C | C | C | C | C | C | C | O | C | O | O | O | O |
| B (10—11—12—13—9) | C | O | C | C | C | O | C | C | C | C | O | C | O | O | O |
| C (11—12—13—9—10) | C | C | O | C | C | C | O | C | C | C | C | O | C | O | O |
| D (12—13—9—10—11) | C | C | C | O | C | C | C | O | C | C | O | O | O | C | O |
| E (13—9—10—11—12) | C | C | C | C | O | C | C | C | O | C | O | O | O | O | C |

C indicated the valve to be closed.
O indicated the valve to be open.

tage gained does not balance the increased difficulties of operation, cost of compression, etc.

When the rosin or other chemically active unsaturated compound is first passed through freshly prepared nickel-aluminum alloy catalyst it will be found that the first samples of hydrogenated product show a very appreciable nickel content. However, after the equipment has been in operation for about 2 to 3 hours the nickel content will be found to drop to the order of one part per million and will remain at this exceedingly low figure as long as the continuity of the process is maintained. After an interruption in the process the nickel content will rise again for a short time and will then fall once more to this very low value.

Maximum benefits will be derived from the catalyst employed. This is due to the cyclic nature of the process, which causes the countercurrent movement of material to be hydrogenated and the hydrogenating catalyst. When the catalyst has become inactive due to long-continued use, its subsequent treatment will depend upon the nature and value of the catalyst. For example, the catalyst produced by the surface activation of pellets of a nickel-aluminum alloy may be reactivated by treatment with an alkali solution, as for example, a caustic soda solution. Prior to this reactivation treatment, it may be found desirable to extract the spent catalyst with a solvent for the rosin or other compound being hydrogenated. In some cases it will be found advantageous to give the spent catalyst an acid pickle prior to the reactivation treatment.

Reactivation of the catalyst may be effected without interruption in the hydrogenation process by merely cutting out of the battery of reactors, the reactor or reactors which contain the spent catalyst and cutting into operation other tubes which contain reactivated or fresh catalyst. This operation can even be performed automatically whenever the percentage hydrogenation of the treated product falls below a predetermined value.

While, as indicated above, I prefer to use the "concurrent up-flow" system which I have described above, I may carry out my invention using a "concurrent down-flow" system in which a mixture of an unsaturated liquid and hydrogen flows downward through the reactors. Such a system is shown schematically in Figure 3. In this figure the various interconnecting conduits and valves necessary to allow the adjustment of the sequence of the reactors have been omitted to reduce the diagram to its simplest form. The location of such valves and conduits will be analogous to those used in the "concurrent up-flow" system shown in Figure 1 and described in detail. It will, of course, be fully appreciated that such valves and conduits are essential in the practical operation of this system in accordance with my invention.

In the operation of the "concurrent down-flow" system, shown schematically in Figure 3, a liquid unsaturated material will pass through conduit 58, and be admixed with hydrogen passing in from line 59 at 60 and pass downward through reactor 61 packed with a stationary hydrogenation catalyst out through conduit 62 to the top of reactor 63 and so on through the system until the resulting mixture of hydrogen and hydrogenated rosin emerges from the bottom of the final reactor and passes through conduit 64 to a separator 65 from which hydrogen passes out through conduit 66 and the hydrogenated rosin with its dissolved hydrogen passed out through conduit 67 to a second separator, not shown, for further separation as described in connection with the "concurrent up-flow" system described above.

As a second alternative, I may carry out my invention using a "counter-current down-flow" system, illustrated schematically in Figure 4. In this schematic figure the various interconnecting conduits and the valves necessary to alter the sequence of the reactors are omitted to reduce the diagram to its simplest form. In this system the unsaturated material passes through conduit 68 and enters the reactor 69 and flows downwardly through a catalyst bed contained in the reactor, mingling with a stream of hydrogen flowing up through the catalyst bed from the conduit 70. The hydrogen leaves the reactor through the conduit 71 and passes to the compressor for re-use. The partially hydrogenated material passes out of the reactor through the conduit 72 to the next reactor and so on through the system, finally emerging from the last reactor through the conduit 73 through which it passes to the separator 74 from which it passes to a second separator not shown, as in the systems described above. The hydrogen originally enters the system by passing into the last reactor through conduit 75 and flows counter-current to the flow of the unsaturated material throughout the entire system.

While the method in accordance with this invention has been exemplified by, primarily, the continuous hydrogenation of rosin, it will be appreciated that the method herein described may be used with advantage for continuous hydrogenation of any unsaturated organic material or other organic material capable of hydrogenation. Thus, for example, acetone may be reduced to isopropyl alcohol by treatment in the hydrogenation equipment above described at ordinary temperatures and very low hydrogen pressures, and cotton seed oil may be readily hydrogenated at 160° C. and 200 lbs. per square inch hydrogen pressure. Other materials such as phenol, naphthalene, nitrobenzol, furfural, pyridine, castor oil, alpha-terpineol, pinene, turpentine or dipentene may be readily hydrogenated either alone or in solution in a suitable solvent. Glucose or quinine may also be readily hydrogenated when dissolved in a suitable solvent.

It will be understood that the number of reactors which are used in the method and apparatus in accordance with this invention can be two or more, as desired. I have found that I prefer to use a system including five reactors, but a smaller or greater number may be used as desired.

The method in accordance with this invention presents very definite advantages. It obtains maximum efficiency from the catalyst used, and allows the production of a hydrogenated product having a uniform degree of saturation and free from appreciable catalyst contamination. It presents safety of operation unobtainable in batch operation, due to the comparatively small amount of material and hydrogen under high pressure at any one time. It provides economy of operation, by avoiding filtration of the hydrogenated product, by avoiding consumption of catalyst in contaminating the rosin and, if desired, by recirculating the excess hydrogen at high pressure, instead of expanding it and then recompressing it.

It will be understood that the details and examples hereinbefore set forth are illustrative only, and that the invention as herein broadly described and claimed is in no way limited thereby.

This application is a continuation-in-part of my application Serial No. 5067, filed February 5, 1935 (now United States Patent No. 2,094,117) granted September 28, 1937.

What I claim and desire to protect by Letters Patent is:

1. A method for the continuous hydrogenation of an unsaturated material which contains the hydrocarbon nucleus of a rosin acid, which includes continuously flowing the unsaturated material in contact with hydrogen successively through a plurality of stationary hydrogenation catalyst beds while under superatmospheric pressure in excess of about 100 pounds per square inch and at a temperature within the range of about 70° C. to about 300° C., until the activity of the catalyst in the beds has dropped materially, replacing the first of the catalyst beds with a fresh catalyst bed and continuously flowing the unsaturated material in contact with hydrogen through the plurality of catalyst beds in such order that the fresh catalyst bed is the last through which the unsaturated material flows.

2. A method for the continuous hydrogenation of an unsaturated material which contains the hydrocarbon nucleus of a rosin acid, which includes continuously flowing the unsaturated material in contact with hydrogen successively through a plurality of stationary hydrogenation catalyst beds while under superatmospheric pressure in excess of about 100 pounds per square inch and at a temperature within the range of about 70° C. to about 300° C., at a rate which varies directly with the activity of the catalyst in the beds, until the rate becomes slow, replacing the first of the catalyst beds with a fresh catalyst bed and continuously flowing the unsaturated material in contact with hydrogen through a plurality of catalyst beds in such order that the fresh catalyst bed is the last through which the unsaturated material flows.

3. A method for the continuous hydrogenation of an unsaturated material which contains the hydrocarbon nucleus of a rosin acid, which includes continuously flowing the unsaturated material concurrently with hydrogen successively through a plurality of stationary hydrogenation catalyst beds while under superatmospheric pressure in excess of about 100 pounds per square inch and at a temperature within the range of about 70° C. to about 300° C. at a rate which varies directly with the activity of the catalyst in the beds, until the rate becomes slow, replacing the first of the catalyst beds with a fresh catalyst bed and continuously flowing the unsaturated material concurrently with hydrogen through a plurality of catalyst beds in such order that the fresh catalyst bed is the last through which the unsaturated material flows.

4. A method for the continuous hydrogenation of an unsaturated material which contains the hydrocarbon nucleus of a rosin acid, which includes continuously flowing the unsaturated material concurrently with hydrogen successively through a plurality of stationary hydrogenation catalyst beds while under superatmospheric pressure in excess of about 100 pounds per square inch and at a temperature within the range of about 70° C. to about 300° C., until the activity of the catalyst in the beds has dropped materially, replacing the first of the catalyst beds with a fresh catalyst bed and continuously flowing the unsaturated material concurrently with hydrogen through the plurality of catalyst beds in such order that the fresh catalyst bed is the last through which the unsaturated material flows.

5. A method for the continuous hydrogenation of an unsaturated material which contains the hydrocarbon nucleus of a rosin acid, which includes continuously flowing the unsaturated material concurrently with hydrogen upwardly through each of a plurality of stationary hydrogenation catalyst beds in succession while under superatmospheric pressure in excess of about 100 pounds per square inch and at a temperature within the range of about 70° C. to about 300° C., until the activity of the catalyst in the beds has dropped materially, replacing the first of the catalyst beds with a fresh catalyst bed and continuously flowing the unsaturated material concurrently with hydrogen upwardly through each of the plurality of catalyst beds in such order that the fresh catalyst bed is the last through which the unsaturated material flows.

6. A method for the continuous hydrogenation of a rosin which includes continuously flowing a rosin in liquid phase in contact with hydrogen successively through a plurality of stationary hydrogenation catalyst beds while under superatmospheric pressure in excess of about 100 pounds per square inch and at a temperature within the range of about 70° C. to about 300° C., until the activity of the catalyst in the beds has dropped materially, replacing the first of the catalyst beds with a fresh catalyst bed and continuously flowing the rosin in contact with hydrogen through the plurality of catalyst beds in such order that the fresh catalyst bed is the last through which the rosin flows.

7. A method for the continuous hydrogenation of a rosin which includes continuously flowing a rosin in liquid phase in contact with hydrogen successively through a plurality of stationary hydrogenation catalyst beds while under superatmospheric pressure in excess of about 100 pounds per square inch and at a temperature within the range of about 70° C. to about 300° C., at a rate which varies directly with the activity of the catalyst in the beds, until the rate becomes slow, replacing the first of the catalyst beds with a fresh catalyst bed and continuously flowing the rosin in contact with hydrogen through a plurality of catalyst beds in such order that the fresh catalyst bed is the last through which the rosin flows.

8. A method for the continuous hydrogenation of an unsaturated material which contains the hydrocarbon nucleus of a rosin acid, which includes continuously flowing the unsaturated material while in solution in an inert solvent in contact with hydrogen successively through a plurality of stationary hydrogenation catalyst beds while under superatmospheric pressure in excess of about 100 pounds per square inch and at a temperature within the range of about 70° C. to about 300° C., until the activity of the catalyst in the beds has dropped materially, replacing the first of the catalyst beds with a fresh catalyst bed and continuously flowing the unsaturated material in contact with hydrogen through the plurality of catalyst beds in such order that the fresh catalyst bed is the last through which the unsaturated material flows.

9. A method for the continuous hydrogenation of an unsaturated material which contains the hydrocarbon nucleus of a rosin acid, which includes continuously flowing the unsaturated material while in the molten condition in contact with hydrogen successively through a plurality of stationary hydrogenation catalyst beds while under superatmospheric pressure in excess of about 1000 pounds per square inch and at a temperature within the range of about 125° C. to about 300° C., until the activity of the catalyst in the beds has dropped materially, replacing the first of the catalyst beds with a fresh catalyst bed and continuously flowing the unsaturated material in contact with hydrogen through the plurality of catalyst beds in such order that the fresh catalyst bed is the last through which the unsaturated material flows.

10. A method for the continuous hydrogenation of a rosin in liquid phase in contact with hydrogen successively through a plurality of stationary hydrogenation catalyst beds while under superatmospheric pressure in excess of about 100 pounds per square inch and at a temperature within the range of about 125° C. to about 300° C., until the activity of the catalyst in the beds has dropped materially, replacing the first of the catalyst beds with a fresh catalyst bed and continuously flowing the rosin in contact with hydrogen through the plurality of catalyst beds in such order that the fresh catalyst bed is the last through which the rosin flows.

11. A method for the continuous hydrogenation of a rosin in liquid phase in contact with hydrogen successively through a plurality of stationary hydrogenation catalyst beds while under superatmospheric pressure in excess of about 2500 pounds per square inch and at a temperature within the range of about 180° C. to about 220° C., until the activity of the catalyst in the beds has dropped materially, replacing the first of the catalyst beds with a fresh catalyst bed and continuously flowing the rosin in contact with hydrogen through the plurality of catalyst beds in such order that the fresh catalyst bed is the last through which the rosin flows.

12. A method for the continuous hydrogenation of a rosin ester which includes continuously flowing the rosin ester in liquid phase in contact with hydrogen successively through a plurality of stationary hydrogenation catalyst beds while under superatmospheric pressure in excess of about 100 pounds per square inch and at a temperature within the range of about 70° C. to about 300° C., until the activity of the catalyst in the beds has dropped materially, replacing the first of the catalyst beds with a fresh catalyst bed and continuously flowing the rosin ester in contact with hydrogen through the plurality of catalyst beds in such order that the fresh catalyst bed is the last through which the rosin ester flows.

13. A method for the continuous hydrogenation of a rosin alcohol which includes continuously flowing the rosin alcohol in liquid phase in contact with hydrogen successively through a plurality of stationary hydrogenation catalyst beds while under superatmospheric pressure in excess of about 100 pounds per square inch and at a temperature within the range of about 70° C. to about 300° C., until the activity of the catalyst in the beds has dropped materially, replacing the first of the catalyst beds with a fresh catalyst bed and continuously flowing the rosin alcohol in contact with hydrogen through the plurality of catalyst beds in such order that the fresh catalyst bed is the last through which the rosin alcohol flows.

14. A method for the continuous hydrogenation of methyl abietate which includes continuously flowing methyl abietate in liquid phase in contact with hydrogen successively through a plurality of stationary hydrogenation catalyst beds while under superatmospheric pressure in excess of about 100 pounds per square inch and at a temperature within the range of about 70° C. to about 300° C., until the activtiy of the catalyst in the beds has dropped materially, replacing the first of the catalyst beds with a fresh catalyst bed and continuously flowing the methyl abietate in contact with hydrogen through the plurality of catalyst beds in such order that the fresh catalyst bed is the last through which the methyl abietate flows.

15. A method for the continuous hydrogenation of abietyl alcohol which includes continuously flowing abietyl alcohol in liquid phase in contact with hydrogen successively through a plurality of stationary hydrogenation catalyst beds while under superatmospheric pressure in excess of about 100 pounds per square inch and at a temperature within the range of about 70° C. to about 300° C., until the activity of the catalyst in the beds has dropped materially, replacing the first of the catalyst beds with a fresh catalyst bed and continuously flowing the abietyl alcohol in contact with hydrogen through the plurality of catalyst beds in such order that the fresh catalyst bed is the last through which the abietyl alcohol flows.

ROLLIN J. BYRKIT, Jr.